Oct. 11, 1960 G. M. BERKIN 2,955,760

RELAY ARITHMETIC DEVICE

Filed Sept. 6, 1957 4 Sheets-Sheet 1

INVENTOR
GEORGE M. BERKIN
BY Marshall M. Truex
ATTORNEY

Oct. 11, 1960 G. M. BERKIN 2,955,760

RELAY ARITHMETIC DEVICE

Filed Sept. 6, 1957 4 Sheets-Sheet 2

Oct. 11, 1960 G. M. BERKIN 2,955,760

RELAY ARITHMETIC DEVICE

Filed Sept. 6, 1957 4 Sheets-Sheet 3

United States Patent Office
2,955,760
Patented Oct. 11, 1960

2,955,760

RELAY ARITHMETIC DEVICE

George M. Berkin, Poughkeepsie, N.Y., assignor to International Business Machines Corporation, New York, N.Y., a corporation of New York Filed Sept. 6, 1957, Ser. No. 682,553

12 Claims. (Cl. 235—174)

This invention relates to arithmetic devices and more particularly to an accumulative summing device employing electromagnetic relays for cyclically adding parallel bits of data and accumulating the total.

Briefly stated, the arithmetic device comprises a group of adder relays actuated in parallel by input pulses, an adder and decoder network of adder relay points for forming the sum of the input pulses and an accumulator including a group of storage relays and an accumulator network of the storage relay points for forming the sum of the number from the adder and decoder network and the number held in the storage relays. A group of five storage relays, each of which is assigned a respective one of the numbers 0 to 4, and an additional carry relay provide a representation of a 0 through 9 sum. Only one storage relay and the carry relay may remain energized at the end of an add cycle, and this condition is checked to provide an accurate sum or an error indication as the case may be.

It is an object of this invention to provide an improved relay arithmetic device.

It is another object of this invention to provide an improved arithmetic device for adding binary numbers and accumulating decimal sums.

It is a further object of this invention to provide a relay accumulator in which one and only one digit storage relay remains energized at the end of the accumulator cycle and for which checking means are provided to ascertain that one and only one digit storage relay is energized at the end of that cycle.

It is another object of this invention to provide a relay adder activated from parallel bits of data to provide a digital sum and a relay accumulator activated from the adder for accumulating successive adder sums.

It is another object of this invention to provide apparatus for forming and accumulating the sum of data bits having an input device for providing coincident signals indicative of the presence of data bits in cycle by cycle succession, an adder and decoder network for forming the sum of the coincident signals at its output, and an accumulator including digit storage relays and an accumulator network activated by the storage relays and by the output signals of the adder and decoder network.

It is another object of this invention to provide arithmetic apparatus for forming and accumulating the sum of data bits as heretofore described having self-checking circuits for ascertaining the accuracy of operation of the accumulative summing device.

It is another object of this invention to provide an improved relay accumulative summing device in which each storage relay represents a digit and in which a newly selected digit relay indicative of the newly formed sum has a fully energized pick coil and an energized hold coil. A relay indicative of the previous lower order number has merely the hold coil energized and when the hold of both of the relays is removed, the newly selected relay is not de-energized between the time the hold is removed and the time it is restored due to its stored energy. The relay of the lower order number is de-energized due to its reduced stored energy.

It is a still further object of this invention to provide an improved device for accumulating sums of data bits comprising a group of operable storage relays, each having an assigned value when operated of 0 through 4 respectively and an operable storage relay having an assigned value of 5 when operated, a group of five relays, each having an assigned value of 1 when energized, a device for energizing the adder relays in response to data bits, an adder network of relay contacts operated by the adder relays for forming the sum of the number of adder relays energized, and an accumulator network including contacts of the storage relays and connected to the adder for forming the sum of adder number and the number indicated by the operated storage relays and for replacing the latter number by the sum last formed.

It is a still further object of this invention to provide improved apparatus for translating values in a first notation to values in a second notation comprising a first group of storage devices for individual operation by signals in the first notation, a network operated by the first group of storage devices for adding the values of the first notation and producing a total in an intermediate notation, and an accumulator coupled to the adder circuits including a second group of storage devices and accumulator circuits operated by the second group of storage devices for forming the sum of the values in the second group of storage devices and the sum of the values in the intermediate notation from the adder circuits in the second notation.

Other objects of the invention will be pointed out in the following description and claims and illustrated in the accompanying drawings, which disclose, by way of example, the principle of the invention and the best mode, which has been contemplated, of applying that principle.

In the drawings:

Figures 1*a*, 1*b*, 1*c* when placed side by side in that order as shown in Figure 1*d* form accumulative summing device.

Figures 1A, 2:
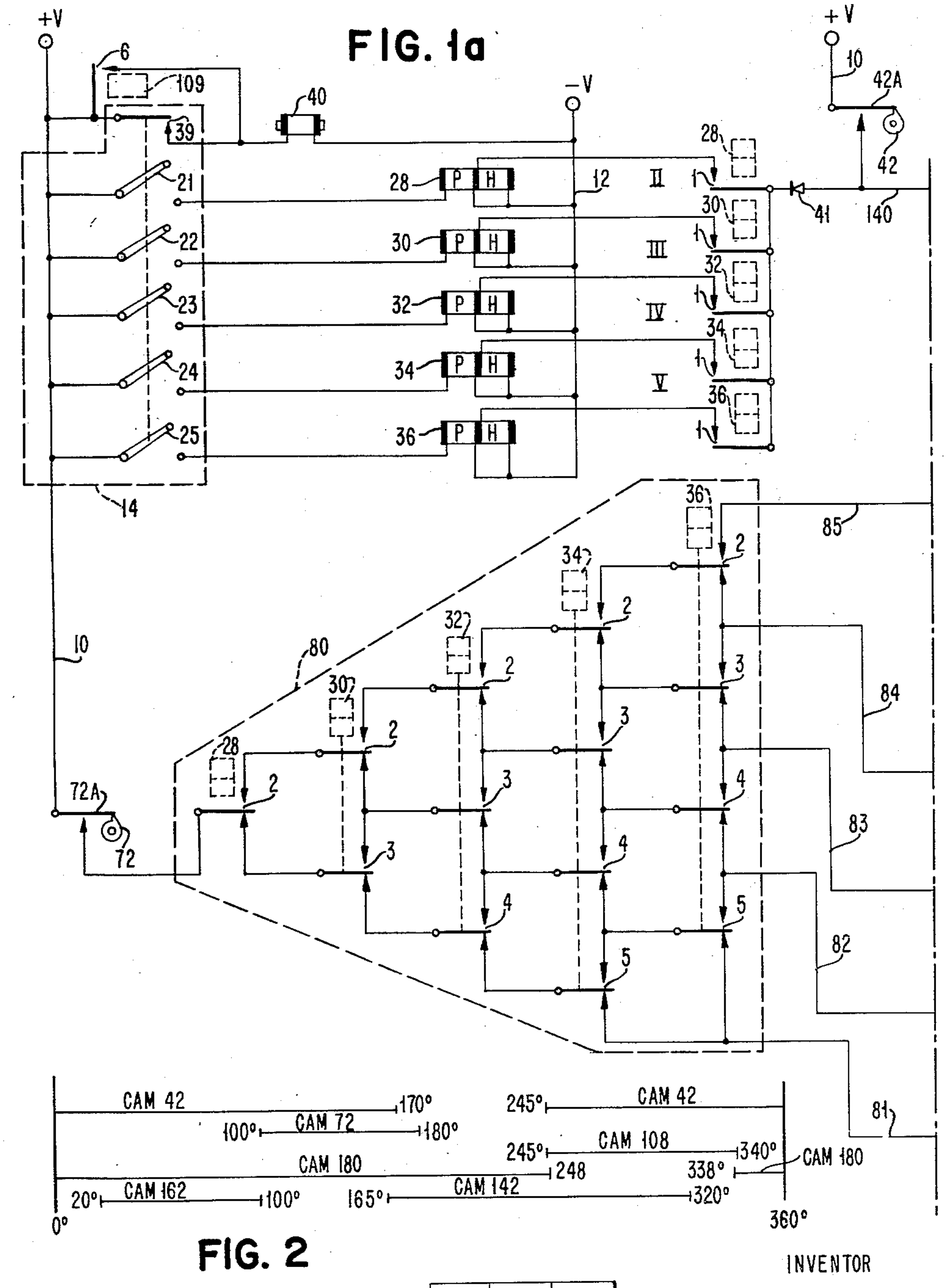
Figure 2 is a sequence chart showing the timing of the cam operated contacts.
Figure 1D:
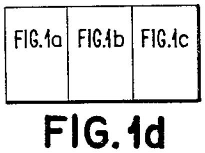

In Figure 1, there is shown a positive side of the line 10 and a negative side of the line 12 which are connected to source of D.C. potential, for example, 40 volts. Connected to the positive side of the line is an input device 14 which comprises a group of five switches 21, 22, 23, 24 and 25 whose open and closed conditions express the binary digits "zero" and "one" respectively. Actually, the switches may be operated by pins which sense perforations in tape or other reading mechanisms, and the device 14 merely serves to illustrate a simplified device for actuating the counter. Each of the switches is connected to its respective one of a group of adder relays 28, 30, 32, 34 and 36.

A contact 39 is provided to complete a circuit to a clutch control magnet 40 for each single or coincident operation of the switches 21 through 25. The clutch control magnet 40 is arranged when energized, to couple a source of mechanical power to a shaft (not shown) for driving cams shown diagrammatically in the figures which open and close contacts according to the timing illustrated in Figure 2. Such electromechanical timing devices are too well known in the art to require a detailed description here.

The relays used may be of any suitable design such as the ones described and claimed in detail in U.S. Patent 2,540,022.

Each adder relay 28, 30, 32, 34 and 36 has its own hold coil connected in series with its normally open "one" point, for example, the 28–1 point is in series with the 28 hold coil. The operating straps of the 28–1 through 36–1 points are wired common, the common side being connected to a diode 41 in series with the contacts 42A of a cam 42 to the positive side of the line 10. The cam 42 is driven by the shaft (not shown) which makes one revolution for each depression of the keys 21 through 25 as previously described, closing these contacts according to the cycle timing shown in Figure 2. It will be understood that 0° is the start of the cycle and that upon depression of one or more switches 21 through 25 a circuit is provided from the positive side of the line through the contacts of the cam 42, through the rectifier 41 to the hold points of the relays 28, 30, 32, 34 and 36.

A group of storage relays 60, 62, 64, 66 and 68 are each assigned a predetermined number from 0 through 4 and a carry relay 70 is used in conjunction with the five storage relays to store numbers 0 through 9 by effectively adding the value of five to the value of the storage relay energized. The following chart indicates the code which represents the value of the number in the biquinary notation held in the group of storage relays:

the input device 14 to energize the adder relays 28, 30, 32, 34 and 36, the latter controlling the adder and decoder network 80 to provide the addend on one of the output lines 81 through 85.

Figure 1B:
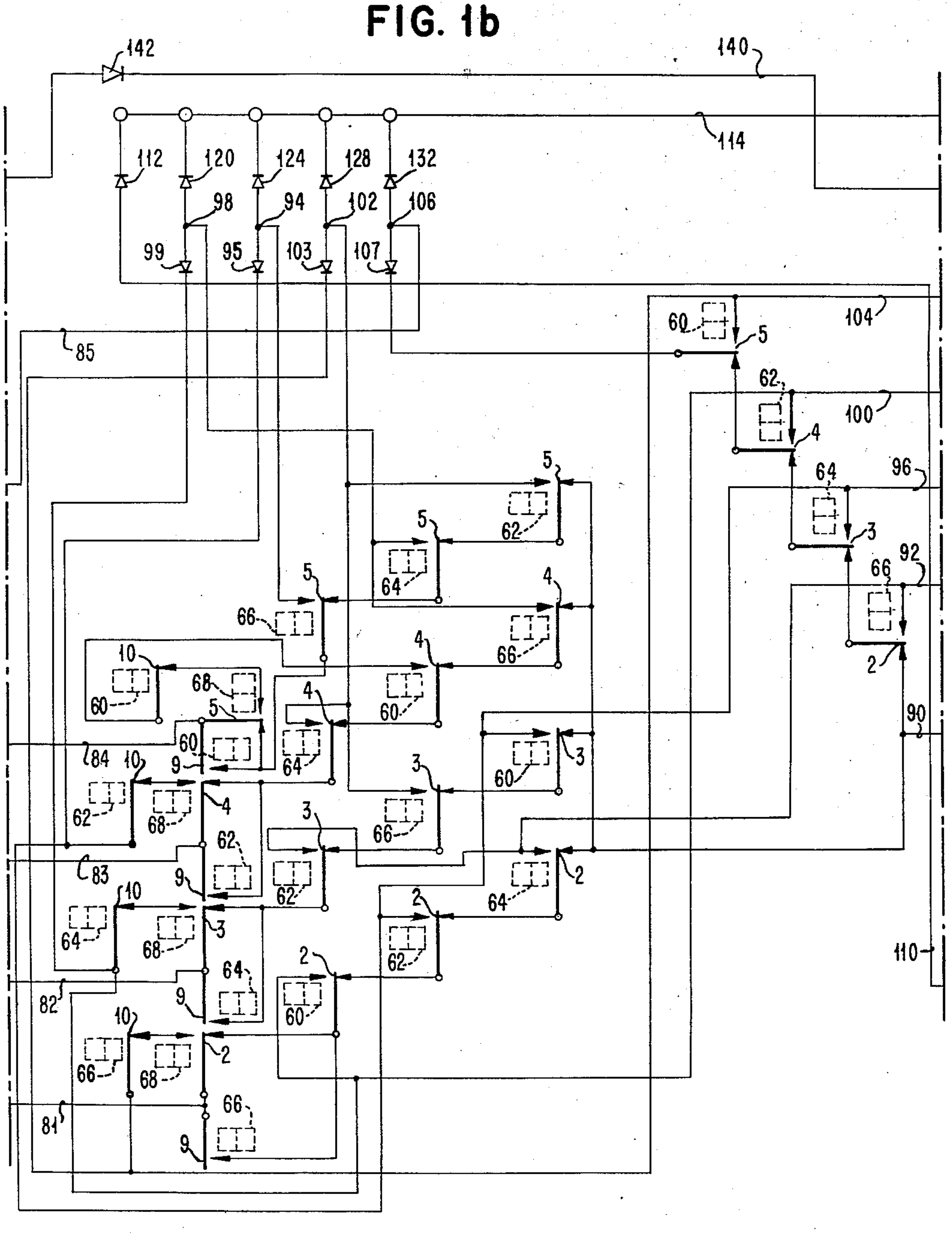

An accumulator network, Figure 1*b*, is hereafter described for receiving the addend from the adder network 80 and forming the sum with the augend held in the storage relays 60, 62, 64, 66 and 68. A series circuit is provided from the line 81, through the 68–2 normally closed and 66–9 normally open points wired in parallel, the 60–2 normally closed, 62–2 normally closed, 64–2 normally closed, to the 66–2 normally closed points, through a line 90 and through the pick coil of the relay 68 to the negative side of the line. A diode 91 is connected in parallel with the relay 68, the anode of the latter being connected to the negative side of the line 12. A series circuit is provided from the line 82 through the 68–3 normally closed and 64–9 normally open points in parallel, the 62–3 points normally closed, the 66–3 points normally closed, the 60–3 normally closed, and from the 60–3 normally closed point to the 66–4 point, and from the 60–3 normally closed point to the 64–2. A series circuit is provided from the line 83 through the 68–4 nor-

| | | | | | | | | | | |
|---|---|---|---|---|---|---|---|---|---|---|
| Storage Relay Energized | 68 | 60 | 62 | 64 | 66 | 68 | 60 | 62 | 64 | 66 |
| Carry Relay 70 Energized | No | No | No | No | No | Yes | Yes | Yes | Yes | Yes |
| Number Stored | 0 | 1 | 2 | 3 | 4 | 5 | 6 | 7 | 8 | 9 |

Energization of the relay 70 and its subsequent de-energization after the counter goes from 9 to 0 indicates a carry, and this operation may then be used to carry into a tens order position of similar construction if desired. The 72A contacts of a cam 72 are an input to an adder and decoder network 80 of relay points of the adder relays 28, 30, 32, 34, and 36. The condition of these points determines to which one of a group of adder output lines 81, 82, 83, 84 and 85 the pulse is applied when the contacts of cam 72 are closed. The normally closed 28–2 point is in series with the normally closed 30–3 point, the normally closed 32–4 point, the normally closed 34–5 point, and with the line 81. The 28–2 normally open point is wired in series with the 30–2 normally closed point, the 32–3 normally closed point, the 34–4 normally closed point, the 36–5 normally closed point, and the line 81. The 30–2 normally closed and the 30–3 normally open points are wired common on the stationary side; 32–3 normally closed and 32–4 normally open points are wired common on the stationary side, and the 34–4 normally closed and the 34–5 normally open points are wired common on the stationary side. The 28–2 normally open, the 30–2 normally open, the 32–2 normally closed, the 34–3 normally closed and 36–4 normally closed points are connected in series to the line 82. The 32–2 normally closed and the 32–3 normally open points are common on the stationary side; the 34–3 normally closed and the 34–4 normally open are wired common on the stationary side; the 36–4 normally closed and the 36–5 normally open points are wired common on the stationary side. The 28–2 normally open, 30–2 normally open, 32–2 normally open. 34–2 normally closed, and 36–3 normally closed points are connected in series to the line 83. The 34–2 normally closed and the 34–3 normally open points are common, and the 36–3 normally closed and the 36–4 normally open points are common. The 28–2 normally open, 30–2 normally open, 32–2 normally open, 34–2 normally open, 36–2 normally closed points are wired in series with the line 84. The 36–2 normally closed and the 36–2 normally open points are common. The 34–2 normally open and the 36–2 normally open points are connected in series to line 85. The transfer of the points of the adder network 80 determines the sum of the number of adder relays energized each cycle and presents this sum as the addend to the accumulator which contains the augend. More specifically, a parallel binary input is supplied by mally closed point and the 62–9 normally open point in parallel, the 64–4 normally closed point, the 60–4 normally closed point, the 66–4 normally closed point and to the 62–5 normally closed point. A series circuit is provided from the line 84 through the 68–5 normally closed point and the 60–9 normally open point in parallel, the 66–5 normally closed point, the 64–5 normally closed point and the 62–5 normally closed point. From the line 84 a series circuit is provided through 68–5 normally open, the 60–10 normally closed and to the 60–4 normally open point. Another circuit is provided from the 62–3 point normally open, to the 64–2 normally open point, to the 66–2 normally open point, through a line 92, and through the pick coil of the relay 66 to the negative side of the line. A diode 93 wired in parallel with the relay 66 in the same sense that the diode 91 is connected to the relay 68. A circuit is provided from the 66–5 normally open point to a terminal 94, through a diode 95, through the 62–10 normally closed points, and to the 68–4 normally open points. Another circuit is arranged from the 62–10 normally closed point, to the 62–2 normally open point, to the 60–3 normally open points, to the 64–3 normally open point, through line 96, and through the relay 64 to pick coil to the negative side of the line. A diode 97 is connected in parallel with the pick coil of the relay 64. A circuit is provided from the 66–4 normally open point to the 64–5 normally open point, to a terminal 98, through a diode 99 to the 64–10 normally closed point, to the 60–2 normally open point, to the 62–4 normally open point, through a line 100, and through the pick coil of the relay 62 to the negative side of the line. A diode 101 is connected in parallel with the pick coil of the relay 62.

Figure 1C:
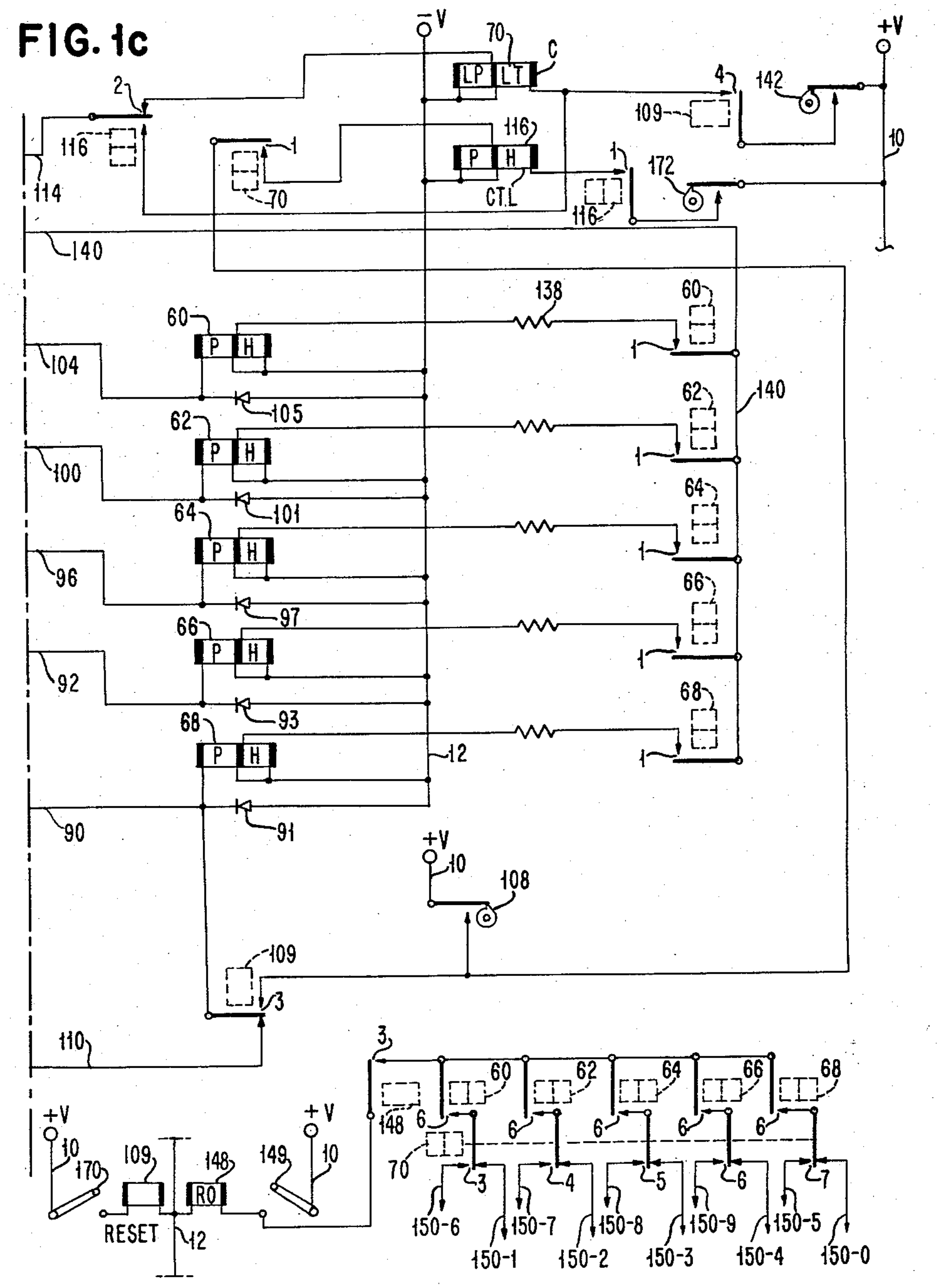

A circuit is provided from the 66–3 normally open point, to the 64–4 normally open point, to the 62–5 normally open point to a terminal 102, through a diode 103 to the 66–10 normally closed point, to the 60–5 normally open point, through a line 104, and through the relay 60 pick coil to the negative side of the line. The stationary strap of the 66–10 normally closed contact is connected to the 68–2 normally open contact, and a diode 105 is connected in parallel with pick coil of relay 60. A circuit is provided from the line 85 to a terminal 106, through a diode 107, through the 60–5 normally closed point, the 62–4 normally closed point, the 64–3 normally closed point, and the 66–2 point to the line 90. In Figure 1*c*, a circuit is provided from the positive side of the line 10 through the contacts of a cam 108, the normally open 109–3 point to the line 90 and to the pick coil of the relay 68. A circuit is provided from the line 90, through the 109–3 normally closed point on a line 110, through a diode 112, a line 114 to the normally closed 116–2 point and through the latch pick coil of the relay 70 to the negative side of the line. A plurality of diodes are connected as follows in the sense shown in Figure 1*b*: A diode 120 between the terminal 98 and the line 114; a diode 124 between the terminal 94 and the line 114; a diode 128 between the terminal 102 and the line 114, and a diode 132 between the terminal 106 and the line 114.

The relays 70 and 116 are latch pick relays of the type shown in U.S. Patent No. 2,510,604, which when energized has its armature attracted to a latching position where a mechanical latch is arranged to hold the armature in the attracted position until a latch trip coil is energized causing the mechanical latch to be released and the contacts to open.

Each of the storage relays 60, 62, 64, 66, and 68 have hold coils each of which are in series with a respective one of a group of resistors 138 and a "1" point to a line 140. The series resistors 138 are of a value selected so that the relay core is less than half saturated. The line 140 completes a circuit through a diode 142, the 42A contacts of the cam 42, and the positive side of the line 10.

There are two possible circuits to the latch trip coil of the relay 70 as follows: from the line 114, through 116–2 normally open point, through the latch trip coil relay circuit, and to the negative side of the line and alternately from the positive side of the line, through contacts of a cam 142, through a normally open reset point 109–4, through the latch trip coil 70 to the negative side of the line.

A circuit to a read-out relay 148 is provided from the positive side of the line through a read-out switch 149, through the pick coil of the relay 148, and to the negative side of the line. The values designated by the storage relays according to the biquinary notation are read out in the decimal notation by providing a voltage at one of a group of contacts 150–0 through 150–9 where in each case the number following the dash is indicative of the value in the counter. Read-out is accomplished by closing of the switch 149 and energizing the read-out relay 148. Another circuit is provided from the positive side of the line through the switch 149, the normally open, now closed, 148–3 point to the operating straps of the contacts 60–6, 62–6, 64–6, 66–6, and 68–6 wired common. The stationary strap of the 60–6 contact is connected to the operating strap of the 70–3 point; the normally closed point of the latter is connected to 150–1 contact normally open, and the normally open point is connected to the 150–6 contact. The stationary strap of the 62–6 normally open contact is wired to the armature of the 70–4 contact; the 70–4 normally closed contact is connected to the 150–2 contact, and the normally open contact 70–4 is connected to the 150–7 contact. The stationary strap of the 64–6 normally open point is connected to the operating strap of the 70–5 contact; the 70–5 normally closed contact is wired to the 150–3 contact, and the 70–5 normally open point is wired to the 150–8 contact. The stationary strap of the 66–6 normally open strap is wired to the common strap of the 70–6 contact; the normally closed side of the 70–6 contact is connected to the 150–4 contact, and the normally open side of the 70–6 contact is connected to 150–9 contact. The stationary strap of the 68–6 normally open contact is connected to the armature of the 70–7; the normally closed contact 70–7 contact is connected to 150–0 contact and the normally open point of 70–7 contact is connected to the 150–5 contact. The transfer of the normally open contacts 60–6, 62–6, 64–6, 66–6, and 68–6 are indicative of the numbers 0 through 4 and the operation of the carry relay effectively adds five to the value which the storage relay represents. It will be understood that the presence of a voltage at individual ones of the contacts 150 is the numerical representation of the number stored and, as such, may be used to actuate a printing mechanism such as a typewriter, indicators such as lamps, and other devices of like purpose.

To illustrate the operation of the device by example, assume that the device is storing "0," i.e. the relay 68 is energized and the relay 70 is not, and further assume that the switches 22, 23 and 24 are closed. Operation of these switches provides a circuit from the positive side of the line to energize the relays 30, 32 and 34. At this time, the clutch is latched up, and the machine is at 0° of the cycle. Accordingly, the contacts of the cam 42 are closed which establishes a hold circuit from the positive side of the line through the contacts 42A of cam 42, through the rectifier 41, and in parallel through the 30–1 point to the hold coils 30 to the negative side of the line, through the 32–1 point to the hold coil 32 to the negative side of the line, and through the 34–1 point to hold coil relay 34 to the negative side of the line. When any one of the switches in the device 14 is closed, the switch 39 closes to establish a circuit from the positive side of the line through the clutch magnet 40 to the negative side of the line. Upon energization of the clutch magnet 40, the clutch is engaged causing the cams to turn and depart from 0°. At 100°, the contacts of the cam 72 close providing a circuit from the positive side of the line through the cam contact 72A; the 28–2 normally closed contacts; the 30–3 normally open, now transferred, contacts; the 32–3 normally open, now transferred, contacts; the 34–3 normally open, now transferred, contacts; the 36–3 normally closed contacts to the line 83; through the 68–4 normally open, now transferred, contacts; through the 62–10 normally closed contacts to, but not through, the 62–2 normally open contacts; to, but not through, the 60–3 normally open contacts; to, but not through, the 64–3 normally open contacts; and through the pick coil of the relay 64 to the negative side of the line. A hold circuit is established for the relay 64 through the A contacts of the cam 42 (Figure 1*a*); through the line 140; through the 64–1 normally open contacts, now closed; through the resistor 138; through the hold coil of relay 64 to the negative side of the line. Since the counter was at 0, a hold coil of the relay 68 has remained energized from the line 140 through the 68–1 normally open point, now closed, through the resistor 138, and through the hold coil of relay 68. From the time that the relay 64 is energized until 180°, two counter relays are up, namely, the relay 68 and the relay 64. The newly selected relay 64 has a fully energized pick coil and a hold coil energized through a resistor 138, but the relay 68 merely has hold coil current through its resistor. Accordingly, the core of the newly selected relay 64 is saturated, while the core of the other relay 68 is less than half saturated. At 170°, the contacts of the cam 42 open and break the hold on the relays 64 and 68. At 180°, the contacts of the cam 72 open the circuit to the pick coil of the relay 64. Stored energy in the relays delays their drop-out in proportion to the amount of energy stored and as a result, the relay 68 drops out in less than 6 milliseconds while a newly selected relay 64 requires at least 12 milliseconds to drop out. The voltage which was used to hold the counter relay through the contacts of the cam 42 is restored after 9 milliseconds at 245°. The speed of operation of the cam shaft is adjusted to be such that relay 68 is permitted to drop out, but cam 42 restores the hold of the relay 64 before it can drop. The accumulator now contains the value 3 in the biquinary notation.

Figure 3:
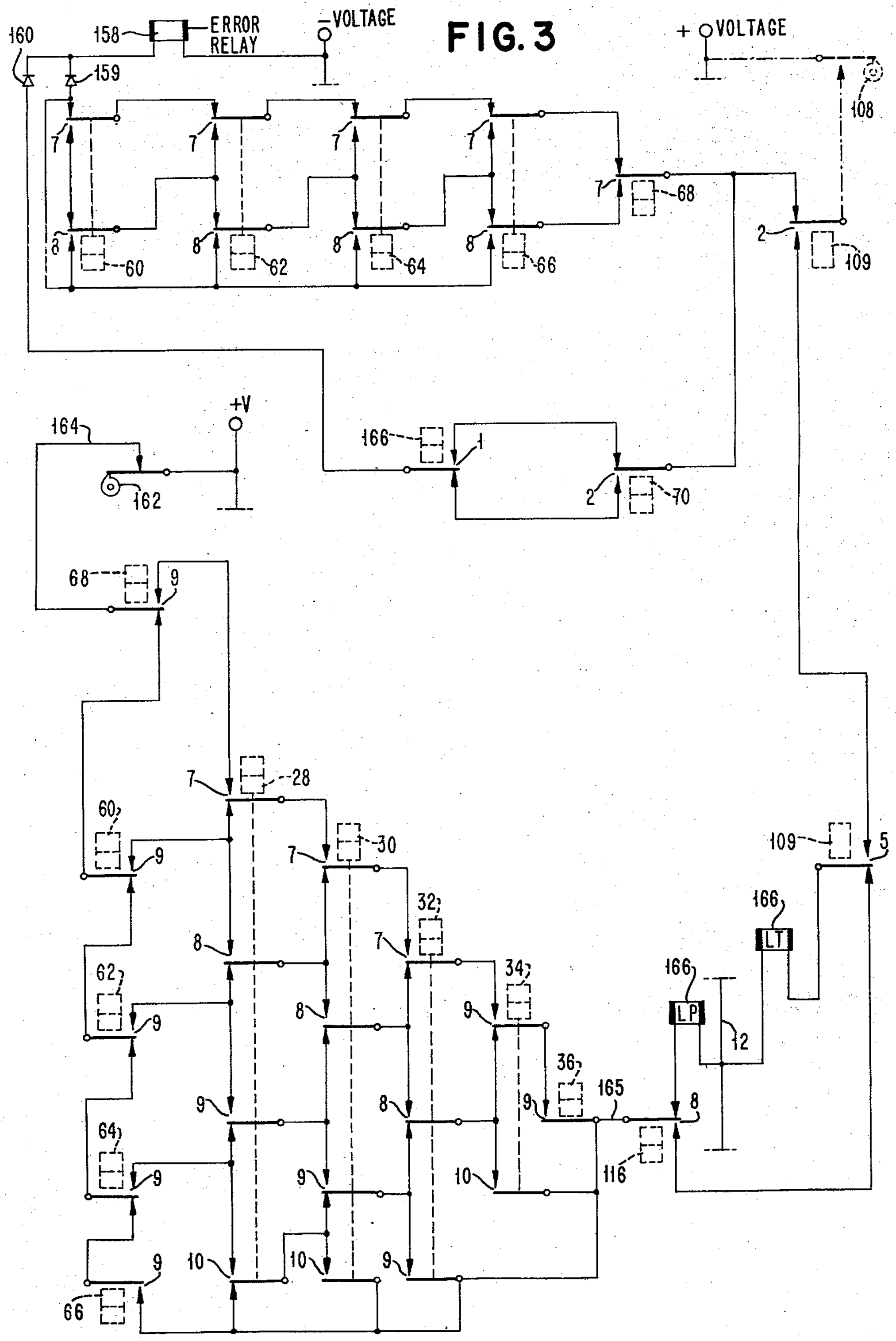
Figure 3 is a circuit diagram of the checking circuits.

With reference to Figure 3 at the top of the drawing, a circuit is shown for checking the fact that one and only one of the storage relays 60, 62, 64, 66, and 68 is up during the time duration of the pulse provided by the cam contact 108 and also to check the fact that at least one of the storage relays is up. If none or more than one storage relay is energized, an error signal is provided by a relay 158. In the example given, the checking circuit is as follows: from the positive side of the line, through the contacts of the cam 108, through the normally closed 109–2 point, through the normally closed 68–7 point, through the normally closed 66–7 point, through the normally open, now transferred, 64–7 point, through the 62–8 normally closed point, through the 60–8 normally closed point, and to the 60–7 normally open point, still open. Notice that a completed circuit is not available to energize error relay 158. If the relay 68 has remained energized, for example, the circuit would be as follows: from the positive side of the line through the contacts of the cam 108, through the normally closed 109–2 point, through the normally open, now transferred, 68–7 point, through the normally closed 66–8 point, through the normally open, now transferred, 64–8 point, to the 62–8 point, to the 60–8 point, through a diode 159, and through the error relay 158 to the negative side of the line. For the instance in which the relay 64 failed to pick or failed to remain energized, and none of the counter relays were up, the circuit would be as follows: from the positive side of the line through the contacts of the cam 108, through the normally closed 109–2 point, through the normally closed 68–7 point, normally closed 66–7 point, normally closed 64–7 point, normally closed 62–7 point, normally closed 60–7 point through the diode 159, and through the error relay 158 to the negative side of the line. The normally open points of the error relay 158 may be used to control an indicating device, for example, a buzzer, lamp or a keyboard lock.

In Figure 3, circuits are also provided in the lower portion of the drawing to check the operation of the relay 70. The input to the circuit is from the positive side of the line through the contact of the cam 162, through a line 164, through the normally closed 68–9 point, through the normally closed 60–9 point, through the normally closed 62–9 point, through the normally closed 64–9 point, and to the normally open 66–9 point. A series circuit is provided from the normally open strap of the 68–9 contact, through the normally open 28–7 contact, the normally open 30–7 contact, the normally open 32–7 contact, the normally open 34–9 contact, the normally open 36–9 contact, a line 165, the normally closed 116–8 point, and the latch pick coil of a carry-check relay 166. Circuit connections are provided as follows: from the 60–9 normally open stationary strap to the normally closed 28–7 point and to the normally open 28–8 point; from the normally open contact 62–9 to the 28–9 normally open point and to the 28–8 normally closed point; from the 28–8 armature to the 30–7 normally closed point and to the 30–8 normally open point; from the stationary strap of the 64–9 normally open point to the 28–9 normally closed point and to the 28–10 normally open point; from the 28–9 armature to the 30–8 normally closed and the 30–9 normally open points; from the armature of the 30–8 point to the 32–7 normally closed point and to the 32–8 normally open point; from the armature of the 28–10 point to the normally closed 30–9 point, and to the normally open 30–10 point; from the 30–9 armature to the normally closed 32–8 point and to the normally open 32–9 point; and from the 32–8 armature to the normally closed 34–9 point and to the normally open 34–10 point. Circuit connections are made from the stationary strap of the normally open 66–9 point to the stationary strap of the 28–10 point, to the armature of the 30–10 point, to the armature of the 32–9 point, to the armature of the 34–10, and to the line 165. The line 165 is connected to the latch pick coil of the carry-check relay 166 through the normally closed 116–8 point. A circuit is provided from the stationary strap of normally open 109–2 point through the 109–5 normally open point, and through the latch trip coil of the carry-check relay 166 to the negative side of the line. A circuit to the negative side of the line is provided from the line 165 through 116–8 normally open point, through the normally closed 109–5 point, and through the latch trip coil of the relay 166.

The circuit to the error relay 158 is as follows: from the stationary strap the 109–2 normally closed point through a combination of the 166–1 and 70–2 points in parallel, through the rectifier 160 and through error relay coil 168 to the negative side of the line. The normally closed side of the carry relay points 70–2 is connected to the normally open side of the carry-check relay point 166–1 and the normally open side of the carry relay 70–2 is connected to the normally closed side of the carry-check relay 166–1. Accordingly, the error relay 158 is energized when the carry-check relay 166 is energized and the carry relay 70 is not, or when the carry relay 70 is energized and the carry-check relay is not. Therefore, each time that the carry relay 70 is energized, the carry-check relay must be energized.

In order to illustrate the operation of the circuits in connection with the operation of the carry relay 70 in the carry-check circuit, it is assumed that the relay 64 is energized as described previously and that the carry relay 70 is down (not latched up) indicating the number stored of 3. At this time, the contacts 22, 23 and 24 are closed and the control relays 30, 32 and 34 are energized in the manner previously described. When the contacts of the cam 72 close, a circuit is provided from the positive side of the line through the cam contacts; through the normally closed 28–2 points; the normally open, now transferred, 30–3 points; the normally open, now closed, 32–3 point; the normally open, now closed 34–3 point; the normally closed 36–3 point; the line 83; through the 68–4 point normally closed; through the 64–4 normally open point, now closed; to the stationary strap of the 66–3 contacts normally open; to the normally open 62–5 point and to the terminal 102. A parallel circuit is provided to the negative side of the line from the terminal 102 as follows: through the rectifier 128, the line 114, through the normally closed 116–2 contacts, and through the latch pick coil of the relay 70. The latch pick relay is of the type previously referred to with respect to U.S. Patent No. 2,510,604, and once energized the armature remains in its attracted position until a latch trip coil is energized, the latter releasing the mechanical latch. Another parallel circuit is completed from the terminal 102 through the rectifier 103, to the 66–10 normally closed points, to the 60–5 normally open point, and through the pick coil of the relay 60. The hold circuit for the relay 60 is provided as previously described through the 60–1 point. The accumulator now contains the value 6 in the biquinary notation.

With reference to the sequence chart of Figure 2, it will be noted that the control relays 30, 32 and 34 are held energized by cam 42 through their hold coils from 0 until 170°, but that the pulse available through the contacts of the cam 72 to pick up the storage relay for this latest operation of the switches and to energize the carry relay 70 is not abailable until 100°. Prior to 100° (between 20° and 100°) the carry-check network of Figure 3 is operated, and at this time the control relays 30, 32 and 34 are energized with the counter relay 64. However, it is still too early for counter relay 60 and carry relay 70 to be energized. Accordingly, the circuit is as follows: from the positive side of the line through the contacts of the cam 162; the line 164; the 68–9 normally closed point, the 60–9 normally closed point; the 62–9 normally closed point; the 64–9 normally open point, now closed; through the 28–9 normally closed point; through the 30–9 normally open, now transferred point; through the 32–9 normally open point, now closed; through the 116–8 normally closed point to pick up the carry-check relay 166. When the carry-check relay 166 is energized, it will be noted that the 166–1 point is transferred thereby completing a circuit from the 109–2 normally closed point, through the 70–2 normally closed point, through the 166–1 point to the relay 158. However, the contacts of the cam 108 do not close until 245° in the cycle so that the relay 158 cannot be energized at this time. Thus, the carry-check relay is picked up prior to the energization of the carry relay 70. At 100°, the contacts of cam 72 close and thereby provide a circuit through the adder network 80 to energize the relay 60 and the carry relay 70 in the manner previously described. The hold circuit for both the relays 64 and 60 are open at 170° and when the hold is restored at 245° through the contacts of cam 42, the hold coil of the relay 64 has dropped out and the hold circuit of the relay 60 is completed before the 60–1 point is opened.

In Figure 3, the two checks are made at 245° when the contacts of the cam 108 are closed. The check to be sure that one and only one of the counter relays is up is provided as follows: from the contacts of the cam 108 through the 109–2 normally closed point, through the 68–7 normally closed point, through the 66–7 normally closed point, through the 64–7 normally closed point, through the 62–7 normally closed point, through the 60–7 normally open, now transferred, point to the 60–8 normally closed, now open, point. Therefore, voltage is prevented from being applied to the error relay 158. A parallel circuit is available from the contacts of the cam 108 through the 109–2 normally closed point, through the normally open, now transferred, 70–2 contacts to the 166–1 normally closed, now open, contacts which prevents application of voltage to the error relay 158.

The counter is reset to 0 (relay 68 energized and relay 70 de-energized) by closing a reset switch 170 which completes a circuit from the positive side of the line to the coil of the reset relay 109. When the reset relay 109 is energized, a circuit is provided to the clutch magnet 40 via the 109–6 point to cause the cams to depart from 0°. At 165° of this restore cycle, contacts of the cam 142 are closed and provide a circuit through the normally open, now closed, 109–4 point, and through the latch trip coil of carry relay 70. Upon energization of the latch trip coil 70, a mechanical latch is released which allows the armature and the points of the relay to return to the normal position. At 170°, the contacts of the cam 42 open and drop out the hold of the counter relays which have been energized previously—in this case, the relay 60 hold coil. At 245°, the contacts of the cam 108 (Figure 1*c*) close and provide a circuit to the relay 68 through the 109–3 normally open, now transferred, point through the coil of the relay 68 to the negative side of the line. At 245°, the contacts of the cam 42 are closed and establish the circuit for the hold coil of the relay 68 through the 68–1 normally open, now closed point to the negative side of the line.

With reference to the number coding chart, when the relay counter relay 5 is energized and that the carry relay is down, the number stored is a 0. When the contacts of the cam 108 close at 245°, a circuit is provided through the 109–2 normally open, now transferred, point, through the normally open, now transferred, 109–5 point, and through the latch trip coil of the carry-check relay 166 to the negative side of the line. Energization of the latch trip coil removes the mechanical latch from the carry-check armature and permits the points of this relay 166 to return to the normal position. At this time, the counter has been reset to 0 by de-energizing the relays 60 and 70 and energizing the relay 68.

To read out of the counter assume the conditions stated before the reset button was operated at which time the counter relay 60 was energized and the carry relay 70 was energized indicating the number stored as 6. To read out the counter, the switch 149 is closed which provides a circuit for the read-out relay pick coil 148. When the read-out relay 148 is energized, a circuit is provided from the positive side of the line through the switch 149; through the 148–3 normally open, now transferred, point; through the normally open, now transferred, 60–6 point; through the normally open, now transferred, 70–3 point; and to the contact 150–6. The fact that a 6 is in the counter is indicated by the presence of a voltage at this terminal. It will be understood that this voltage may be applied to an indicator whereby the presence of this voltage, which is indicative of a 6, is displayed or recorded. The value of the counter is not destroyed by the fact that the number is read from the counter. For the counter to be read out and reset, it is necessary that both the read-out relay 148 and reset relay 109 be energized in a sequence such that the read-out relay is energized prior to the energization of the reset relay with a time allowance sufficient for the reading of the terminals 150–0 to 150–9.

In order to properly illustrate the action of the carry relay 70, it is necessary that another cycle of operation be explained. For this purpose it will be assumed that the counter relay 60 is energized and that the carry relay 70 is energized which indicates a number stored is 6. At 245° of the cycle in which the relays 60 and 70 are energized, the control relay 116 is energized from the contacts of the cam 108 at 245° and the 70–1 normally open, now transferred, point and remains energized through its pick coil until 340°. At 338°, a hold circuit is provided from the contacts of a cam 180 through the normally open, now closed, 116–1 point, and through the hold coil of the relay 116. On the next succeeding cycle, the switch 21 is closed which energizes the pick coil of the control relay 28, and a hold circuit is provided through the contacts of the cam 42 through the rectifier 41 to the 28–1 normally open, now closed, point, and through the hold coil of the relay 28. Also, the switch 39 is closed providing a circuit to the clutch magnet 40 causing the cams to depart from 0°. At 20°, a circuit is completed from the positive side of the line through the contacts of the cam 162 (Figure 3); through the line 164, through normally closed contact 68–9; the normally open, now closed, 60–9 point; the 28–8 normally open, now closed, point; the normally closed 30–7 point, and to the normally open 32–7 point, still open. Thus, the carry-check relay 166 is not energized. At 100°, the contacts of the cam 72 close to provide a circuit to the relay network through the normally open, now transferred, 28–2 point; the normally closed 30–2 point; the normally closed 32–3 point; the normally closed 34–4 point; the normally closed 36–5 point; the line 81; the 68–2 normally closed point; the 60–2 normally open, now transferred, point; to the 62–4 normally open stationary strap; through the line 100, the relay 62 and to the negative side of the line. Another circuit path may be followed from the normally open 60–2 point to the normally closed 64–10 point and to the normally open 68–3 point where the circuit is open. Still another circuit path is available from the 64–10 armature to the rectifier 99, but not through, since this is the high resistance direction of the diode or rectifier. Accordingly, a back circuit is prevented.

It is pointed out at this time that although the 116–2 (Figure 1*c*) normally open point is now closed, the armature of the carry relay 70 remains in the transferred or latched position, being held there by the mechanical latch. A complete circuit is not provided through the diodes 112, 120, 124, 128 and 132 to the line 114 and through 116–2 normally open, now transferred, point to the latch trip coil of the relay 70 due to the condition of the accumulator network. Accordingly, the carry relay 70 remains in the latched or transferred position. Now, the storage relay 62 is energized and the carry relay remains latched so that the number stored is a 7. At 245° when the tests are made in Figure 3, the contacts of the cam 108 close, and a circuit is provided through the 109–2 point normally closed; through the 68–7 normally closed point;

the 66–7 normally closed point; the 64–7 normally closed point; the 62–7 normally open, now transferred, point; through the 60–8 normally closed point; and to the 60–7 normally open point where the circuit is open. Alternately, a circuit is provided from the 109–2 normally closed point; through the 70–2 normally open, now transferred, point; and to the 166–1 normally closed, now transferred, point where the circuit is broken. It is pointed out at this time that when the network to the carry-check relay 166 was energized by the closing of the contacts of the cam 162, the circuit was open at the 32–7 normally open point. However, the carry-check relay 166 is of a mechanical latching type mentioned previously and remains latched with the contacts transferred until energization of its latching trip coil. In this instance, the 116–8 normally open contacts are transferred, but the voltage is not available to the line 165 and accordingly the latch trip coil 166 cannot be energized. However, it is pointed out that when the number stored is 9 and an additional digit is added to change the counter value from 9 to 0 or some other higher order number, a circuit is provided from the contacts of the cam 162 through the network and through the 116–8 normally open, now transferred, point, through the 109–5 normally closed point, and through the coil of the 166 latch trip relay to the negative side of the line. This releases the armature of the relay 166 from its latched position. It is this transition from 9 to 0 when the carry relay 70 is dropped out through energization of its latch trip coil via the control point 116–2 that a carry may be sent to the next higher order position.

The diodes 41, 95, 99, 103, 107, 112, 120, 124, 128, 132, 142 are for the purpose of preventing back circuits. The diodes 91, 93, 97, 101 and 105 are for the purpose of dissipating the energy of the coils with which they are connected in parallel. When the relay 68, for example, is energized the diode 91 is biased so that it does not conduct; however, when the voltage is removed from the coil and the polarity of the coil reverses, the diode is biased so that it presents a low resistance to the flow of current and the current flows readily in the loop.

While this explanation has concerned a units position, it is to be understood that multiple devices may be used, for example, to accumulate tens, hundreds, thousands. Furthermore, while there have been shown a set of switches 21 through 25 for supplying single bits in parallel to the adder, it is understood that the number of switches and adder relays is merely illustrative and that the relay network may be expanded or contracted to accommodate a greater or lesser number of inputs.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An arithmetic device comprising, in combination, input apparatus having channels for supplying signals indicative of binary bits of data for each channel, a first plurality of storage devices, one for each of said input channels and each operable in response to a data signal, an adder and decoder network including switches operated by said storage devices effective to provide the sum of said data signals designated the addend at the one of a plurality of output lines of said network corresponding to the value of the sum of said input signals, an accumulator connected to said output lines including a second plurality of storage devices operably settable in bistable states for storing an accumulated sum designated the augend and an accumulator network of contacts operated in response to the states of said second storage devices and coupled to said adder and decoder network to receive the addend therefrom, to add the latter to the augend according to the operated contacts, and to form the sum by setting selected ones of said accumulator storage devices, and means for resetting said storage devices representing the augend when said sum is formed.

2. An accumulative summing device comprising input apparatus having channels for supplying signals indicative of binary bits for each channel, a plurality of add magnets one for each input channel and each operable to transfer switches in response to a binary bit, an adder and decoder network including said switches operated by said magnets for providing the sum of said binary bits as the addend at its output, and accumulator apparatus including a plurality of storage magnets effective to transfer switches when operated and to hold an augend in the biquinary notation and including an accumulator network having circuits and said switches operated by said storage magnets connected to the output of said adder and decoder network and effective to receive said addend therefrom, to add the latter to said augend held by said storage magnets, and to form a sum, and means to store the sum last formed in said storage magnets.

3. An arithmetic device for accumulating the sums of data bits comprising storage means including bistable devices for holding an accumulated total when operated, sensing means including bistable devices cyclically operable in response to data bits, adding means including a network of switches operated in response to said sensing means and effective to cyclically form the sum of the data bits, accumulating means connected to said adding means and including a network of switches operated by said storage means effective to accumulate the sum from said adding means and the sum held in said storage means, and means for retaining the last-formed accumulative sum in said storage means.

4. Arithmetic apparatus for translating values of a plurality of orders in a first notation to values of one order in a second notation comprising a first plurality of storage devices, one for each of said orders in a first notation and each effective when operated for storing a value of said first notation, actuating means coupled to said storage devices for operating the latter in response to values in said first notation, adder means coupled to said storage devices having a plurality of outputs, each of said outputs corresponding to a value in an intermediate notation when operated, and effective to operate one of said outputs in response to operation of said storage devices, accumulator means coupled to said outputs of said adder means including a second plurality of storage devices effective when operated for storing values of one order in the second notation and circuits responsive to the outputs of said adder means and said second plurality of storage devices for forming the sum of the value in said intermediate notation and the value in said second notation, and means for storing the last-formed sum in said second plurality of storage devices.

5. In an arithmetic device for accumulating the sums of data bits comprising a group of five operable storage relays, each representing a number 0 through 4 respectively when operated, and another operable storage relay representing "plus five" when operated, said storage relays effective to hold a sum of 0 through 9 when said group of relays are operated singly and in combination with said "plus five" relay, a group of adder relays, each representing a "one" when energized, apparatus coupled to said adder relays for energizing the latter relays in response to data bits, a first network of circuits and contacts operably connected to said adder relays for forming the sum of the data bits, a second network connected to said first network and operated by contacts of said storage relays and effective to accumulate the sum from said first network with the sum held by said storage relays, and apparatus for replacing the prior accumulated sum held by said storage relays with the accumulated sum last formed.

6. A claim in accordance with claim 5 having means for ascertaining the accuracy of operation of the accumulative summing device comprising detecting circuits operable in response to said storage relays for the values of 0 through 4 for ascertaining that one and only one of said storage relays exclusive of said "plus five" relay is energized when each sum has been accumulated, means including circuits operable in response to said adder relays and said storage relays for operating a checking relay, and an error checking circuit for ascertaining that said checking relay and said relay representing "plus five" are energized and de-energized coincidently, and means responsive to said detecting circuits and said last-mentioned means for indicating a failure in operation.

7. An accumulative summing device having a plurality of storage relays, each having a coded representation for representing the value of a sum when energized singly and in coded combinations, a plurality of adder relays, means actuating said adder relays in parallel in response to individual data bits, means including contacts operated from said adder relays for serially forming the sum of said data bits on one of a plurality of output lines, means including an accumulator network operated in response to the contacts of said storage relays and said signals from said output lines of said adder for forming the sum of said numbers stored from said adder and storing the same.

8. An arithmetic device for accumulating sums of data bits comprising a group of operable storage magnets, each representing a designated numerical value when operated of 0 through 4 respectively, an operable carry magnet having a value representing 5 when operated, a group of five adder magnets each having an assigned value of 1 when energized, means for energizing said adder magnets in response to data bits, adder means including a network of circuits and contacts operated by said adder magnets for forming a sum of the data bits, accumulator means including a network having circuits and contacts operated by said storage magnets connected to said adder and effective to add the sum of the data bits to the number designated by said operated storage magnets to form a result, means for storing the result thus formed in said storage magnets, and means for indicating the accumulated result stored in said storage magnets.

9. An accumulative summing device comprising, in combination, an input device for providing coincident signals indicative of the presence of numerical values in a first notation in cycle by cycle succession, means coupled to said input device including a first network having a plurality of output terminals, one for each value of an intermediate notation, and effective for cyclically forming the sum of the coincident signals, converting the same to the intermediate notation, and presenting the sum at the one of the terminals corresponding with the sum value, and accumulator means connected to said terminals including a plurality of storage devices effective when operated to hold an accumulated sum in a second notation and including apparatus operated in response to the sum at one of the terminals of said first network and to said storage devices for adding the values associated therewith and forming a result in a second notation and storing the same in said storage devices when operated, and means associated with said storage devices and cyclically effective when said result is formed whereby said storage devices representing said accumulated sum are not held and said storage devices representing said result are operated.

10. An accumulative summing device comprising, in combination, an input device for providing coincident signals indicative of the presence of values in a plurality of orders in a first notation in cycle by cycle succession, means coupled to said input device including an adder and decoder network for cyclically forming the sum of said values and converting the same to an intermediate notation at one of a plurality of outputs, accumulator means including storage apparatus and an accumulator network operated in response to said storage devices and by the output of said adder and decoder network for forming and accumulating the sum of said values in a second notation and means coupling the output of said adder and decoder network to said accumulator network.

11. A plurality of parallel data channels, means sequentially providing data pulses to said channels in parallel, a first plurality of settable storage devices, each connected to a data channel and operable in response to data pulses, summing means including a plurality of switchable circuits operable in response to the setting of said storage devices for successively forming in parallel the sum of the data pulses at the one of a plurality of output lines corresponding to the sum, accumulator means including a second plurality of settable storage devices and an accumulator network actuated in response to said second plurality of storage devices and by the sum of said output lines from said summing means for forming the sum serially and retaining the latter in said second plurality of storage devices.

12. Apparatus for forming the sum of two or more numbers comprising a first plurality of electromechanical relays one for each number to be summed, means for selectively energizing said relays to represent the numbers to be summed, adding circuits including a first plurality of switches controlled by said first plurality of relays for forming the sum of said numbers, a second plurality of electromagnetic relays effective for holding a sum when operated and each having a first and a second coil, accumulating circuits including a second plurality of switches controlled by said second plurality of relays for accumulating the sum from the adding circuits and the sum held in said second plurality of relays, means operating said second plurality of relays to represent the sum from said accumulating circuits by energizing said first and second coils of selected ones of said relays to represent a first sum and subsequently operable means for de-energizing said first coil of said selected coils representing said first sum, energizing said first and second coils of selected ones of said relays to represent a second sum, and de-energizing said second coil of said selected coils representing said first sum.

References Cited in the file of this patent

UNITED STATES PATENTS

| | | |
|---|---|---|
| 2,364,540 | Luhn | Dec. 5, 1944 |
| 2,473,444 | Rajchman | June 14, 1949 |
| 2,787,415 | Cartwright | Apr. 2, 1957 |
| 2,873,914 | Hebel | Feb. 17, 1959 |
| 2,906,458 | Svoboda | Sept. 29, 1959 |

OTHER REFERENCES

"Proceedings of the Association for Computing Machinery" (Auerbach), published by Richard Rimbach Associates, Pittsburgh 12, Pa., 1952 (page 71 relied on).